Inventor
PETER J. PRESTON

United States Patent Office 3,436,095
Patented Apr. 1, 1969

3,436,095
VEHICLE JACKING SYSTEMS
Peter John Preston, Bletchley, England, assignor to Lancer Machinery Limited, Leighton Buzzard, England, a corporation of Great Britain
Filed Jan. 10, 1967, Ser. No. 608,440
Claims priority, application Great Britain, Jan. 21, 1966, 2,905/66
Int. Cl. B60s 9/10; B66f 3/46
U.S. Cl. 280—150                                5 Claims

ABSTRACT OF THE DISCLOSURE

This invention relates to jacking systems comprising first and second fluid-pressure operated jacking devices connected in parallel by a fluid path and each adapted for independent connection to a source of pressure fluid, a nonreturn valve being provided in the fluid path to permit pressure fluid actuating the first jacking device to actuate the second jacking device when the pressure fluid in the former is at least equal to that in the latter.

Figure 1:
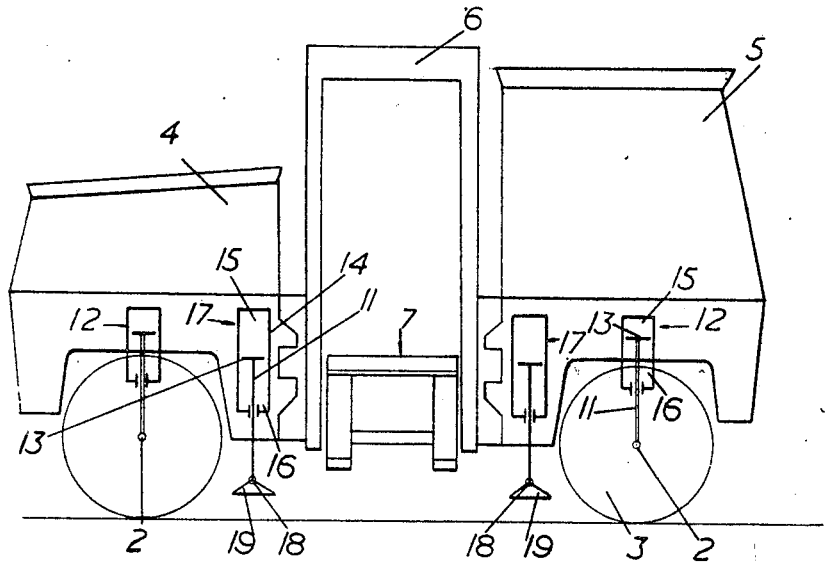

The invention also includes a vehicle comprising a chassis, one end portion of at least one of the road wheel axles pivotally connected to the chassis, a jacking system as aforesaid incorporated in the chassis so that a first jacking device, acting between the chassis and the floor, operates to adjust the height of the chassis with respect to the floor on which the vehicle rests, the second jacking device interacting between the chassis and the other end of the pivoted axle to raise the chassis with respect to the axle.

*Brief summary of the invention*

This invention relates to jacking systems, and particularly to such systems incorporating two or more jacks in which one jack may be used to take a progressively increasing share of the load already applied to another jack, as for example in the jacking of tunnelling supports and similar structures. The system of the invention is, however, suitable for application to side loading fork lift trucks having a compensated suspension system. In such vehicles, the weight of the chassis is supported with respect to the axles at one side of the vehicle by fluid pressure operated jacks. When the lifting mast is traversed across the chassis and a load applied to the lifting forks, it is necessary to extend stabilizing jacks to the ground at the loading side of the vehicle to share the load with the first-named jacks when handling heavy loads.

It has hitherto been found difficult when transferring the load from one jack to another to adjust the fluid supply to the jacks in such a way as to prevent jerking or momentary retraction of one or more of the jacks, and it is the main object of the present invention to minimise or eliminate the aforesaid disadvantage.

According to the present invention, a jacking system comprises first and second fluid-pressure operated jacking devices connected in parallel by a fluid path and each adapted for independent connection to a source of pressure fluid, a nonreturn valve being provided in the fluid path to permit pressure fluid actuating the first jacking device to actuate the second jacking device when the pressure fluid in the former is at least equal to that in the latter.

It will be understood that at least one of said jacking devices may comprise a number of jacks connected in parallel.

At least one of the jacking devices may conveniently be connected through a second nonreturn valve to at least one further jacking device which may comprise a number of jacks connected in parallel, said valves permitting pressure fluid from the first and second jacking devices to actuate each further jacking device when the fluid pressure in the first and second devices is at least equal to that in the latter.

Conveniently, the jacking devices used are double acting and have corresponding sides of their cylinders interconnected in parallel by a fluid path, each fluid path containing a nonreturn valve arranged to open when the pressure applied to the first jacking device is at least equal to that applied to the second, the valves respectively in the fluid paths connecting opposite sides of the cylinders operating in the opposite sense.

From another aspect a vehicle comprises a chassis to which an end portion of at least one of the vehicle axles is pivotally connected, the vehicle incorporating the jacking system of the invention in such a manner that the first jacking device, which acts between the chassis and the floor, may be operated to adjust the height of the chassis with respect to the floor on which the vehicle rests, the second jacking device interacting between the chassis and the other end of the pivoted axle to raise the chassis with respect to the axle.

The first jacking device may be connected in parallel to one or more jacks spaced along the chassis to act between the chassis and the floor, each axle of the vehicle being pivoted at one end to the chassis and connected at its other end to the chassis by a jacking device in parallel with the second jacking device and operable to allow the chassis to be raised with respect to the axles.

Figure 2:
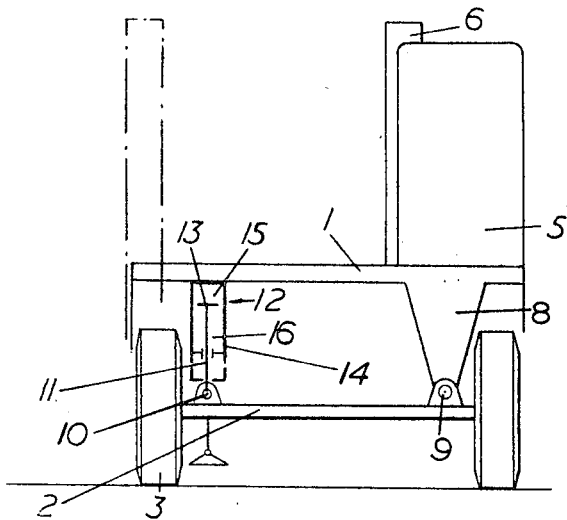
Figure 3:
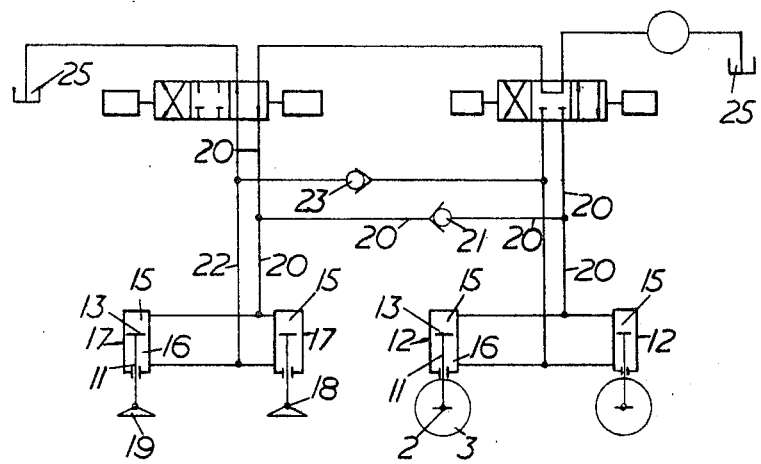

In order that the invention may be more fully understood, an embodiment in accordance therewith incorporated in a vehicle will now be described, by way of example, with reference to the accompanying diagrammatic drawings in which:

FIG. 1 is a side elevation of a vehicle incorporating a jacking system of the invention, FIG. 2 is an end elevation of the vehicle shown in FIG. 1, and FIG. 3 is a hydraulic circuit diagram showing the manner in which the jacks in the jacking system of the invention are interconnected.

Referring to the drawings, the jacking system of the invention is shown incorporated in a side-loader fork lift vehicle, during the operation of which it is desirable to transfer to one or more jacks a portion of the load already carried by one or more other jacks supporting the chassis as will be described hereinafter.

FIGS. 1 and 2 show a side-loader fork lift vehicle having a chassis 1 suported on axles 2 carrying wheels 3. The engine compartment and driver's cabin of the vehicle are represented in outline only at 4 and 5 respectively. The vehicle carries a mast 6 supported in conventional manner for movement across the vehicle in the direction shown by the arrow, the mast carrying a conventional fork lifting arrangement shown generally at 7 in FIG. 1 but omitted in FIG. 2. FIG. 2 shows at its right hand side in full lines the mast 6 in its fully retracted position, and in dotted lines on the left hand side the mast when fully extended.

Each of the vehicle axles is connected to a downwardly extending chassis member 8 by a horizontal pivot 9, as will be seen more clearly from FIG. 2. The other end portion of each axle is connected by a horizontal pivot 10 to the piston rod 11 of a jacking device shown as a hydraulic double-acting jack designated generally at 12 and comprising a piston 13 slidably disposed in a cylinder 14 and dividing the latter into pressure chambers 15 and 16 at either side of the piston respectively. The upper part of the cylinder 14 is connected to the chassis 1 by any suitable devices so as to be solid therewith or it may be pivotally connected thereto. The chambers 15 and 16 respectively of each jack 12 are connected in parallel and it will thus be seen that any downward movement of the chassis 1 with respect to the axle 2 caused, for example, by the mast 6 traversing from one side of the chassis to the other, can be resisted or compensated for by increasing the pressure in the cylinders 14 of the jacks 12 thereby urging the chassis upwardly with respect to the axle 2. The jacks designated 12 will be hereinafter referred to as "axle jacks."

Further jacking devices shown as jacks 17, hereinafter referred to as "stabilising jacks," two of which are shown, and having the same parts 11, 13, 14, 15 and 16 as the jacks 12, are arranged with their cylinders 14 connected to the vehicle chassis 1, the outer ends of their piston rods 11 having connected thereto, at 18, feet 19 for jacking contact with the floor upon which the vehicle rests upon admission of pressure fluid to the chamber 15.

The hydraulic circuit controlling the operation of all the jacks is shown in FIG. 3, and the operation of the jacking system is as follows.

During the periods when the vehicle is not required to lift relatively heavy loads the weight of the chassis is carried entirely by the pivot 9 and the axle jacks 12, which latter may be adjusted by controlling the pressure in the chambers 15 to maintain the chassis in a substantially horizontal attitude. When it is desired to use the vehicle for lifting purposes, the mast 6 is traversed across the chassis to the loading side with its forks extending outwardly therefrom in the conventional manner, and on applying a load to the outwardly extending forks, a considerable moment of force tends to pivot the chassis downwardly about the pivot 9, the only resistance to such force being the axle jacks 12. To assist in preventing undue deflection of the chassis from the horizontal, particularly during heavy lifting operation, the stabilising jacks 17 are actuated to cause the feet 19 thereof to contact the floor on which the vehicle rests, and on applying further pressure to the chambers 15 of the jacks 17 the chassis will be caused to rise with respect to the floor.

Referring now particularly to FIG. 3, it will be seen that the pressure chambers 15 of the jacks 17 are connected in parallel by means of the fluid path 20 with the pressure chambers 15 of the jacks 12, communication between the jacks 17 and 12 being prevented, when the pressure in the jacks 17 is less than that in the jacks 12, by a nonreturn valve 21. A similar circuit is also provided for the chambers 16 of the jacks 12 and 17, which latter are connected in parallel by a path 22 containing a nonreturn valve 23 acting in the opposite sense to the valve 21. It will be seen that the pressure in the chambers 15 of the jacks 12 will maintain the nonreturn valve 21 in the closed position preventing communication between the jacks 17 and 12 until the pressure in the chambers 15 of the jacks 17 becomes equal to that in the jacks 12, after which, any further increase of pressure in the jacks 17 will cause the valve 21 to open so that an equal pressure is applied to the jacks 12 and 17 and the total weight of the vehicle and its load is then shared by all the jacks. The valve 23 will open simultaneously with the valves 21 to enable fluid to be ejected from the chambers 16 of the jacks to return to a fluid source.

Fluid is supplied to the jacks 12 and 17 from a fluid source 25 respectively through conventional control valve mechanisms which form no part of the invention and which will therefore not be further described.

In order to retract both sets of jacks under the load, fluid is allowed to return to the source 25 from the jacks 12 thereby simultaneously lowering the pressure in all the chambers 15. The feet 19 of the jacks 17 are then retracted by operating the valve mechanism supplying the jacks 17 to raise the pressure in the chamber 16 thereby moving the piston 13 towards the tops of the cylinders 14.

Although the system described consists of two stabilising jacks and two axle jacks respectively connected in parallel, it will be appreciated that only one of each type of jack need be provided, or alternatively more than two of one or both types may be used. Moreover, the jacks may be single acting jacks rather than the double acting type described, in which case the fluid path 22 and nonreturn valve 23 are not provided. It will also be understood that the second jacking device may be used to raise and lower the chassis with respect to the axle.

It will be seen that the system of the invention provides a means particularly suitable for incorporation in a side loading fork lift vehicle as described, whereby a loaded jack or jacks may each be relieved of a portion of its load by one or more further jacks without the unevenness of operation usually encountered in such systems. The system of the invention may also be used in such operations as the progressive jacking of tunnelling supports, in which a number of jacks or sets of jacks may be connected together through nonreturn valves as described herein to enable additional supports to be added as the length of the tunnel increases without interrupting the supply of pressure fluid to the existing supports.

What is claimed:

1. A bulk load maneuvering vehicle having a chassis and wheels upon which said chassis is mounted, first fluid pressure operated jacking means operatively connected to said chassis and operable to engage the ground on which said vehicle stands partially to support the chassis, second fluid pressure operated jacking means interacting between said chassis and said wheels, pressure fluid supply means, means for selectively connecting said first jacking means to said supply means, means for selectively connecting said second jacking means to said supply means, said first and second jacking means being connected in parallel in a fluid path, and a nonreturn valve in said fluid path responsive to the pressure in both said jacking means whereby when the pressure in said jacking means is equal, pressure fluid actuating said first jacking means will actuate said second jacking means.

2. The vehicle as defined in claim 1 wherein said chassis is pivotally connected to said wheels about a horizontal axis, said second jacking means being operative to tilt said chassis about such axis.

3. The vehicle as defined in claim 2 wherein said axis extends along one side of said chassis, said first and second jacking means acting along the opposite side of said chassis.

4. The vehicle as defined in claim 1 including front and rear axles on which said wheels are mounted, said chassis being directly pivoted to said axles about a horizontal axis extending along one side of said chassis, said first and second jacking means acting along the opposite side of said chassis.

5. The vehicle as defined in claim 4 wherein said first and second jacking means each comprise a plurality of jacking members.

References Cited

UNITED STATES PATENTS

| 2,890,805 | 6/1959 | Pilch | 91—412 X |
| 3,186,686 | 6/1965 | Mayer. | |
| 3,216,736 | 11/1965 | Thomas | 280—6.1 |
| 3,179,432 | 4/1965 | Chaneac et al. | |
| 3,184,867 | 5/1965 | Symmank. | |
| 3,191,954 | 6/1965 | Schvetz. | |
| 3,288,436 | 11/1966 | Silva. | |

LEO FRIAGLIA, *Primary Examiner.*

JOEL E. SIEGEL, *Assistant Examiner.*

U.S. Cl. X.R.

280—43.23